(12) United States Patent
Bagwell et al.

(10) Patent No.: US 7,558,642 B2
(45) Date of Patent: Jul. 7, 2009

(54) METHOD, APPARATUS, AND PRODUCT FOR OPTIMIZING MANUFACTURING TESTS BY INTEGRATING PART AND TEST OBJECTS IN THE SAME ORDER CONFIGURATION APPLICATION

(75) Inventors: Derek P. Bagwell, Rochester, MN (US); Gary V. Tollers, Rochester, MN (US); Cheranellore Vasudevan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 11/741,090

(22) Filed: Apr. 27, 2007

(65) Prior Publication Data

US 2008/0269934 A1 Oct. 30, 2008

(51) Int. Cl.
 G06F 17/50 (2006.01)
 G06F 19/00 (2006.01)
 G06Q 30/00 (2006.01)
(52) U.S. Cl. .............................. 700/108; 700/97; 705/1
(58) Field of Classification Search .................. 700/97, 700/108–110; 717/120, 121, 124; 714/738; 705/1, 26
 See application file for complete search history.

(56) References Cited

U.S. PATENT DOCUMENTS

| | | | |
|---|---|---|---|
| 5,555,416 A | | 9/1996 | Owens et al. |
| 5,963,743 A | * | 10/1999 | Amberg et al. .............. 717/174 |
| 6,192,355 B1 | | 2/2001 | Skovgaard |
| 6,543,047 B1 | * | 4/2003 | Vrhel et al. .................. 717/121 |
| 6,598,223 B1 | * | 7/2003 | Vrhel et al. .................. 717/174 |
| 6,725,367 B2 | | 4/2004 | Morrison et al. |
| 6,735,757 B1 | * | 5/2004 | Kroening et al. ............ 717/120 |
| 6,832,435 B2 | | 12/2004 | Sanders et al. |
| 6,892,104 B2 | | 5/2005 | Patil et al. |
| 7,043,619 B1 | | 5/2006 | Knight |
| 7,065,499 B1 | | 6/2006 | Seth et al. |
| 7,073,050 B2 | | 7/2006 | Chen et al. |
| 7,080,388 B2 | | 7/2006 | Smith et al. |
| 7,103,813 B1 | | 9/2006 | Tracy et al. |
| 7,194,323 B2 | * | 3/2007 | Kritt et al. ..................... 700/97 |
| 2002/0073375 A1 | * | 6/2002 | Hollander .................... 714/739 |
| 2007/0143124 A1 | * | 6/2007 | Blouin et al. ................... 705/1 |
| 2008/0147223 A1 | * | 6/2008 | Erickson et al. ............. 700/108 |

FOREIGN PATENT DOCUMENTS

WO 0201237 A2 1/2002

* cited by examiner

*Primary Examiner*—Maria N. Von Buhr
(74) *Attorney, Agent, or Firm*—Yee & Associates, P.C.; Steven L. Bennett

(57) ABSTRACT

A method, apparatus, and product are disclosed for optimizing manufacturing testing of a customized configuration of a product. A plurality of part objects are defined within an order configuration application. Each one of the part objects is associated with one of a plurality of parts. A plurality of test objects is defined within the order configuration application. Each one of the test objects is associated with one of a plurality of tests. The order configuration application is used to generate order information using the part objects that are associated with parts that are selected to be included in a customized product. The order configuration application is also used to generate test cases using the test objects that are associated with the part objects that are associated with parts that are selected to be included in a customized product.

20 Claims, 8 Drawing Sheets

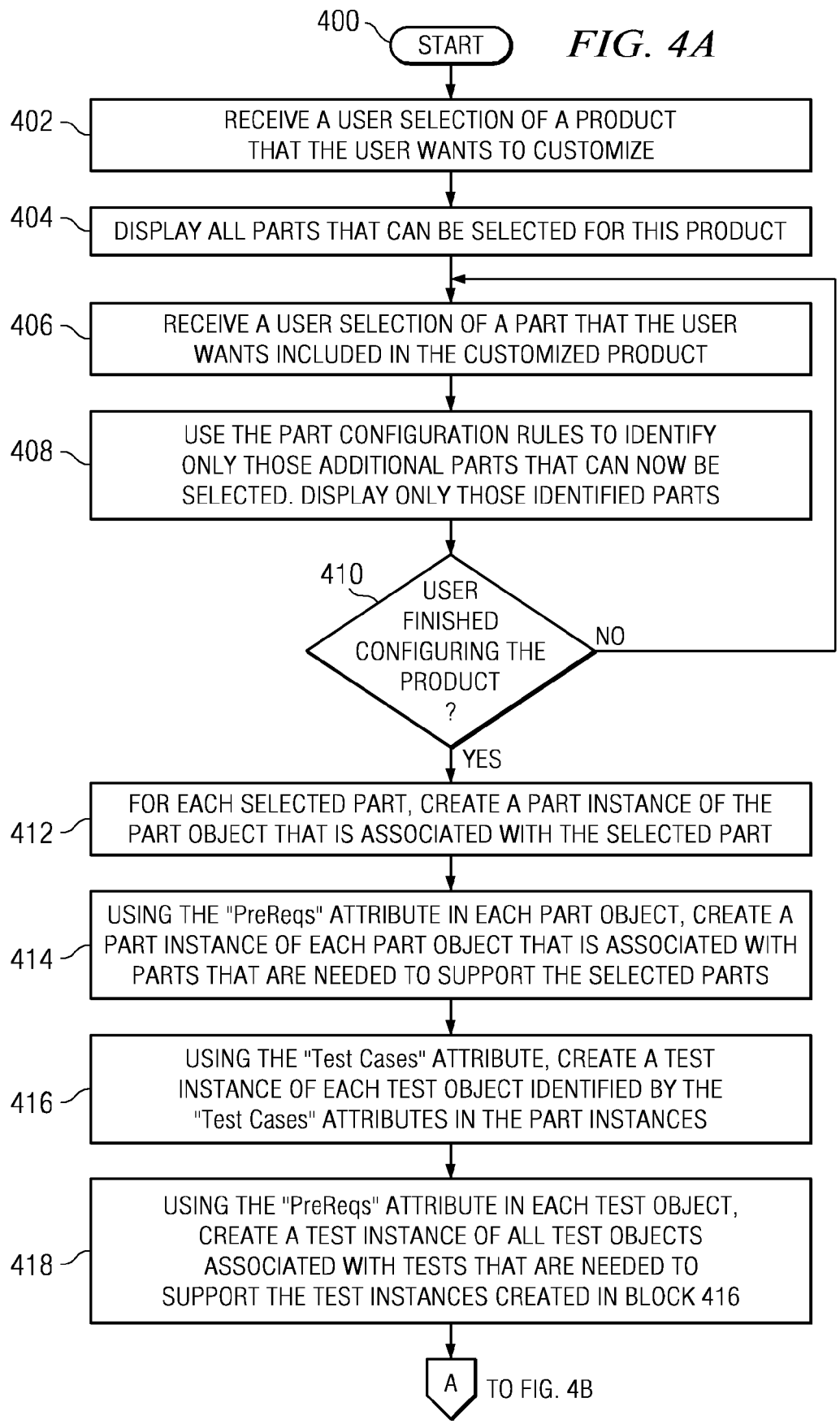

METHOD, APPARATUS, AND PRODUCT FOR OPTIMIZING MANUFACTURING TESTS BY INTEGRATING PART AND TEST OBJECTS IN THE SAME ORDER CONFIGURATION APPLICATION

BACKGROUND OF THE INVENTION

1. Field of the Invention

The present invention relates generally to a method, apparatus, and product for optimizing manufacturing tests by integrating part and test objects in the same order configuration application.

2. Description of the Related Art

When products are "built to customer order", there is often substantial variability in the products being produced, even within different configurations of a single product. A product can be configured in many different ways. For example, a customer could choose to order a standard product. Alternately, the customer could select a product and customize it by selecting the parts that the customer is interested in having included in the customer's particular customized configuration of the product. These parts, also called options, could include different memory types/sizes/speeds, different storage devices, different processors, etc. Thus, a first customer might configure their product to include one set of parts, while a second customer might configure their product to include a second set of different parts.

Order configuration software applications, referred to sometimes as configurators, exist which permit a customer to select the parts that the customer wants to have included in the customer's customized product. This customized product is also referred to as the order configuration of the product. Once a customer has completed customizing the product using the order configuration software application, the application can be used to generate order information output that is provided to fulfillment and manufacturing to assist in the manufacturing process.

FIG. 1 is a high level flow chart that depicts permitting a user to configure a customized product using a configuration software application that outputs order information in accordance with the prior art. The order information is supplied to the fulfillment and manufacturing systems for manufacturing the customized product. The process starts as illustrated by block 100, and thereafter passes to block 102 which depicts permitting a user to configure a customized product using a configuration software application. The application includes a part object for each part. Typically, a user is permitted to select a product, and the parts the user wants to include in the product, via an entry screen that is displayed by the configuration software application.

Thereafter, block 104 illustrates receiving a user selection of a part to be included in the customized product. The process then passes to block 106 which depicts using configuration rules to identify only those additional parts that can now be selected. Only those identified parts are displayed. For example, the selection of a particular part, might preclude other parts from being included in the customized product.

The process then passes to block 108 which illustrates a determination of whether or not the user has finished configuring the product. If a determination is made that the user has not finished configuring the product, the process passes back to block 104 to permit the user to select additional parts. If a determination is made that the user has finished configuring the product, the process passes to block 110 which depicts using the part objects for the selected parts to generate an output from the application. The output includes order information. Next, block 112 illustrates supplying the order information to fulfillment and manufacturing systems for manufacturing the customized product. The process then terminates as depicted by block 114.

Once a product is manufactured, that product should be tested. According to the prior art, in order to test a product, a suite of tests is run on the product. This suite of tests includes all tests that would be needed to adequately test all of the parts that can be selected for a product. This suite of tests is run on all customized products regardless of which parts are actually included in each customized product.

For complex products, the suite of tests is a very large set of tests. Running the complete suite of tests on all manufactured customized products is both expensive and time consuming. In fact, not all of the tests may be equally important for all different types of product configurations. There are numerous variations of configurations for large systems like enterprise servers, communication switches, base station equipment, etc.

FIG. 2 is a high level flow chart that depicts testing each manufactured product using a complete suite of tests regardless of which parts are actually included in the customized product in accordance with the prior art. The process starts as illustrated by block 200, and thereafter passes to block 202 which depicts creating a suite of tests to use to test all parts and configuration of parts for this product. The suite of tests tests every part that might be included in the customized product. Next, block 204 illustrates receiving a manufactured customized product. Block 206, then, depicts testing the manufactured customized product using the complete suite of tests, regardless of which parts are actually included in this customized product. The process then terminates as illustrated by block 208.

While the process of testing all products using the complete suite of tests adequately tests the products, in many cases, not all of the tests need to be run. Running all of the tests for every customized product, regardless of whether all of the tests are necessary, is very time consuming and ties up valuable resources.

BRIEF SUMMARY OF THE INVENTION

The illustrative embodiment is a method, apparatus, and product for optimizing manufacturing testing of a customized configuration of a product by automatically identifying the most appropriate test based on the selected parts to be included in a customized configuration of a product.

A method, apparatus, and product are disclosed for optimizing manufacturing testing of a customized configuration of a product. A plurality of part objects are defined within an order configuration application. Each one of the part objects is associated with one of a plurality of parts. A plurality of test objects is defined within the order configuration application. Each one of the test objects is associated with one of a plurality of tests. The order configuration application is used to generate order information using the part objects that are associated with parts that are selected to be included in a customized product. The order configuration application is also used to generate test cases using the test objects that are associated with the part objects that are associated with parts that are selected to be included in a customized product.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A and 4B together depict using a configuration software application, which includes both part and test objects, to generate both order information about a customized product and test cases that are tailored to the customized product in accordance with the illustrative embodiment;

DETAILED DESCRIPTION OF THE INVENTION

The illustrative embodiment provides a configuration software application that is used when a customer wants to order a product. The configuration software application presents different parts that the customer can select to be included in a product. In this manner, the customer can customize a product that the user wishes to purchase. After the customer has finished selecting parts, the order configuration software application generates order information output that includes information about each selected part, as well as other information. This order information is then used in the fulfillment and manufacturing systems to manufacture the ordered customized product.

According to the illustrative embodiment, test objects are also included in the configuration software application. Each test object is defined within the configuration application as a test case. Thus, each test object represents a test case. A test object encapsulates all information about a particular test case. In this manner, all information about a test case is grouped together in one area, making it easier to locate the information as well as modify the information.

Each part object is associated with one or more of these test objects. The test objects associated with a part object represent the test cases that need to be performed in order to properly test the part object's part. Thus, when a part is selected, its part object is used to identify the part object's associated test objects. The process continues as parts are selected until the product has been customized.

Once all parts have been selected, the identified test objects are used to generate test cases. The generated test cases are those test cases that need to be performed in order to test the parts that are included in the customized product configuration. In this manner, the configuration software application generates not only the order information about the customized product, but the test cases that need to be performed in order to test the customized product. Thus the configuration software output generates test cases that are tailored to the product as ordered.

According to the illustrative embodiment, the test objects and part objects described below are objects within an object-oriented environment. Those of ordinary skill in the art will recognize, however, that the illustrative embodiment described herein can be practiced using other processing environments.

Although the output of the order configuration software application can take any form, according to the illustrative embodiment, the output is a textual or XML output.

Figure 1:
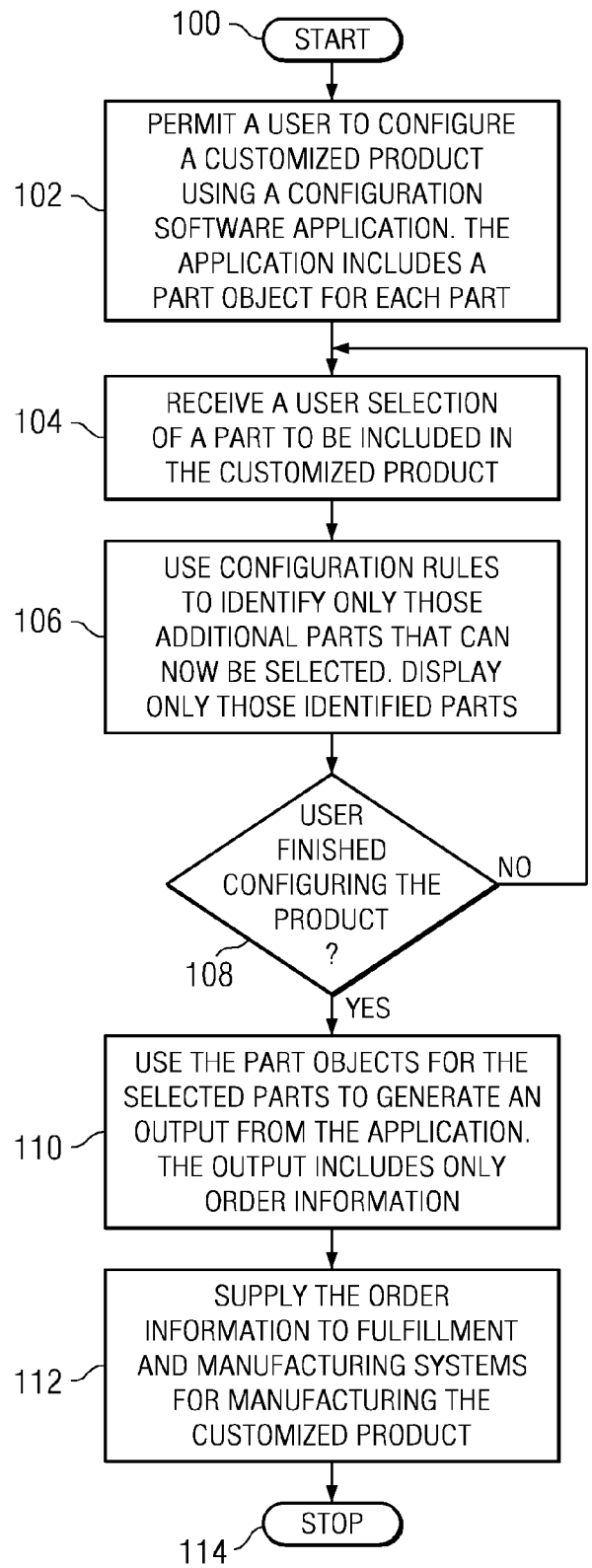
FIG. 1 is a high level flow chart that depicts permitting a user to configure a customized product using a software application that outputs order information for fulfilling and manufacturing the customized product in accordance with the prior art.
Figure 2:
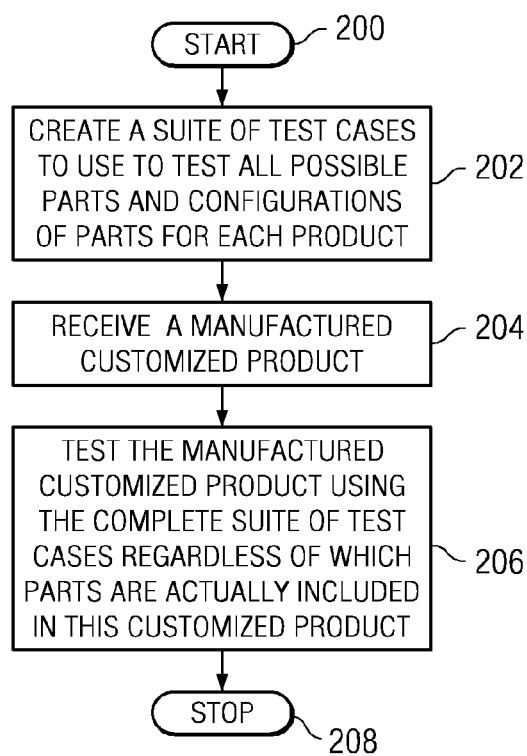
FIG. 2 is a high level flow chart that depicts testing each manufactured product using a complete suite of tests regardless of which parts are included in the product in accordance with the prior art.
Figure 3:
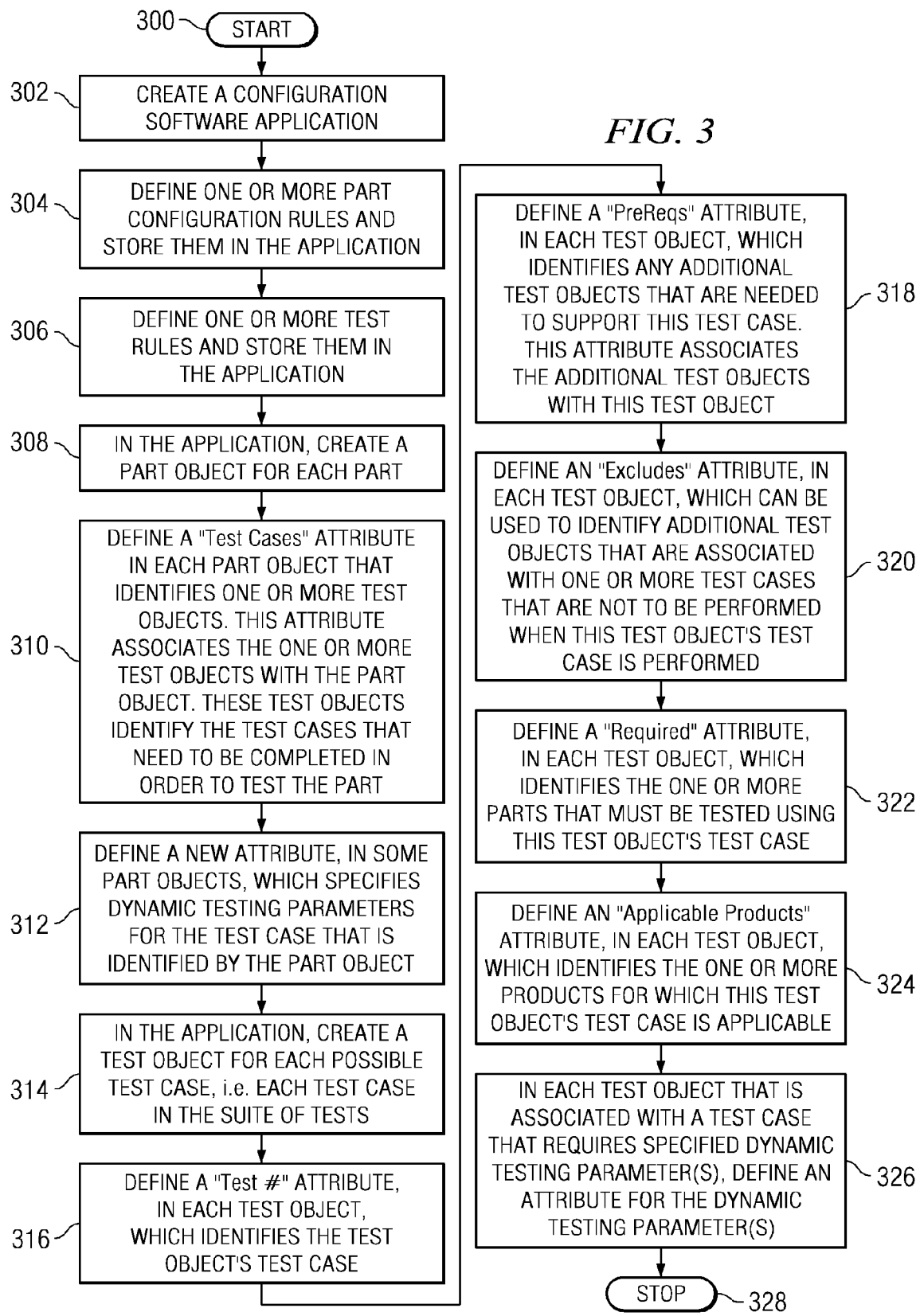
FIG. 3 is a high level flow chart that illustrates defining both part and tests objects in a single order configuration software application, which will output order information as well as customized test cases that were selected for testing only those parts that are actually included in the customized product in accordance with the illustrative embodiment.

FIG. 3 is a high level flow chart that illustrates defining both part and tests objects in a single order configuration software application, which will output order information as well as customized test cases that were selected for testing only those parts that are actually included in the customized product in accordance with the illustrative embodiment. FIG. 3 depicts the process of building and designing the objects and rules that are included in the software application.

The process starts as depicted by block 300, and thereafter passes to block 302 which depicts creating an order configuration software application. Block 304, then, illustrates defining one or more part configuration rules. These rules are also referred to as part rules. These parts configuration rules are then stored in the application. The parts configuration rules govern the selection of parts.

The configuration rules might require the selection of a first part if a second part is selected. For example, if the product is a computer system, the part configuration rules could require the selection of a cable if a printer is selected to be included with the product.

Alternatively, if a first part is selected, the configuration rules could prohibit the selection of other parts. For example, if a particular tape drive will not fit into a particular cabinet, when that cabinet is selected, the configuration rules would prohibit the selection of this tape drive. Therefore, the order configuration software could filter out the selection of the tape drive when the cabinet is selected.

Next, block 306 illustrates defining one or more test rules. These test rules are stored in the application. The test rules can be static or dynamic. For example, a static test rule might require that a particular test is selected if a particular part is selected. A dynamic test rule is applied based on the parameter in a selected part object that is associated with a selected part.

The following are examples of test rules:

The rules to select test objects depend on the specific product and the associated parts and the different ways they can be put together. Typical types of rules are:

Compatibility—(A is compatible with B or A is not compatible with C, etc.),

Capacity (can not have more than x #s)

Pre-requisites (A needs B)

Co-requisites (A requires B and B requires A)

Mutually exclusive (if A, not B and if B, not A)

The same types of rules may be applicable for test case selection, too.

For example, the functional rules are:

If "Cache memory" is present, then select "Memory Walk Test"

If "Mirroring HDD" is selected, then select "Disk replication test"

If "Speed of Selected Processor" is more than 2 GHz, then select "Fast DMA test"

If "Puma Cabinet" is selected, then select "2 day burn-in test"

If "2-day burn test" is selected, then select, "Disk formatting test"

If "Disk replication test" is selected, then "Disk formatting test" should also be selected If "Disk replication test" is selected, skip "File copy test"

If "SIT duration" is <3 days and "Linux OS" is selected, avoid "OS imaging test"

The above rules can be specified by engineering/test departments along with other product configuration data/rule maintenance. However, the above rules will be internally modeled with standard techniques like auto-expansion, filtering, co-requisite/pre-requisite validation, etc.

Block 308 depicts creating, in the application, a part object for each part. The software application is an object oriented application, and the objects described herein are software objects within such an object oriented software application.

The process then passes to block 310 which illustrates defining a "test case" attribute in each part object that identifies one or more test objects. This attribute associates the one or more test objects with the part object. The test objects identify the test cases that need to be completed in order to test the part. Thereafter, block 312 depicts defining a new attribute, in some part objects, which specifies dynamic testing parameters for the test case that is identified by the part object.

Next, block 314 illustrates creating a test object in the application for each possible test case, i.e. each test case in the suite of tests. The process then passes to block 316 which depicts defining a "test #" attribute, in each test object, which identifies the test object's test case. Block 318, then, illustrates defining a "PreReq" attribute, in each test object, which identifies any additional test objects that are needed to support this test case. This attribute associates the additional test objects with this test object.

The process then passes to block 320 which depicts defining an "excludes" attribute, in each test object, which can be used to identify additional test objects that are associated with one or more test cases that are not to be performed when the test object's test case is performed. The results of these test cases, were they performed, would be invalid. Thereafter, block 322 illustrates defining a "required" attribute, in each test object, which identifies the one or more parts that must be tested using the test object's test case.

Next, block 324 depicts defining an "applicable products" attribute, in each test object, which identifies the one or more products for which the one or more test object's test case is applicable. Block 326 illustrates, in each test object that is associated with a test case that requires one or more dynamic testing parameter(s), defining an attribute for the additional parameter(s). The process then terminates as depicted by block 328.

Figure 4B:
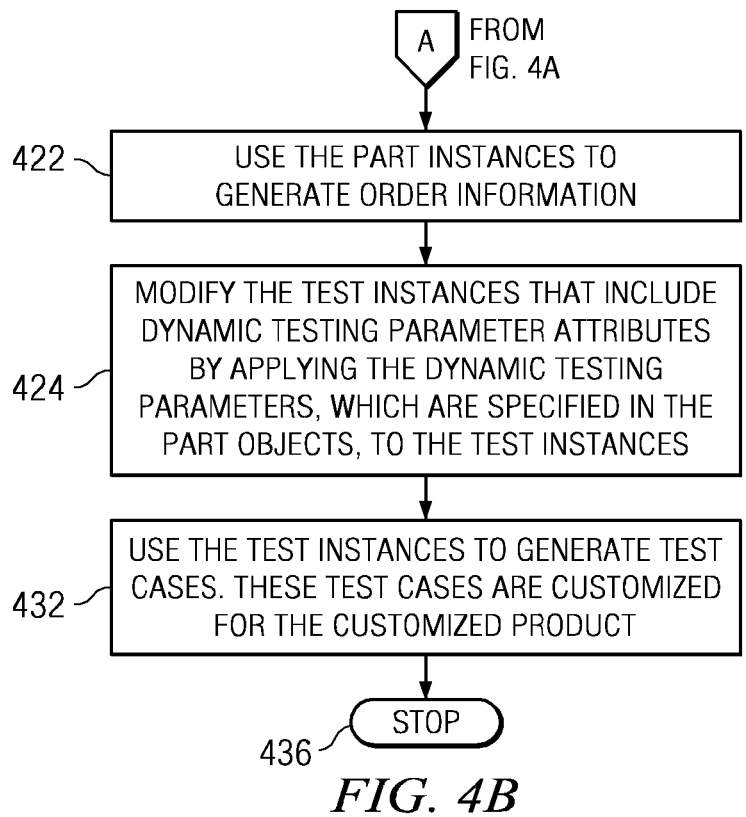

FIGS. 4A and 4B together depict using an order configuration software application, which includes both part and test objects, to generate both order information about a customized product and test cases that are tailored to the customized product in accordance with the illustrative embodiment. The process starts as depicted by block 400, and thereafter passes to block 402 which illustrates receiving a user selection of a product that the user wants to customize. Next, block 404 depicts displaying all parts that can be selected for this product.

The process then passes to block 406 which illustrates receiving a user selection of a part that the user wants included in the customized product. Next, block 408 depicts using part configuration rules to identify only the additional parts that can now be selected. Only those parts that can now be selected are displayed. Thereafter, block 410 illustrates a determination of whether or not the user has finished configuring the product. If a determination is made that the user has not finished configuring the product, the process passes back to block 406 to receive additional part selections. If a determination is made that the user has finished configuring the product, the process passes to block 412 which illustrates, for each selected part, creating a part instance of the part object that is associated with the selected part.

Next, block 414 depicts creating a part instance of each part object that is associated with all parts that are needed to support the selected parts. Each part object can be associated with other part objects. When a part object is associated with other part objects, a part instance of these other part objects is also created because the parts, which are associated with these other part objects, are needed to support the selected part.

For example, if a disk drive is selected, a cable for the disk drive is needed to support the selected disk drive. In this case, when the disk drive is selected, a part instance is created of the part object that is associated with the selected disk drive. The disk drive part object will also be associated with the cable part object. When the disk drive is selected, a part instance of the cable part object is also created.

Each part object includes a "test case" attribute. When a part is selected, the part's part object is used to identify the test cases that are necessary in order to properly test the part. Thus, when the part is selected, a test instance of the test cases that are identified by the part's part object is also created. Block 416 illustrates creating a test instance of each test object that is identified by "test case" attributes in the part instances that have been created.

The process then passes to block 418 which depicts using the "PreReqs" attribute in each test instance created in block 416 to create a test instance of each test object that is associated with tests that are needed to support the tests of the test instances in block 416. The process then passes to block 422, as depicted through connector A.

Block 422, then, depicts using the part instances to generate order information. Next, block 424 depicts modifying the test instances that include dynamic testing parameters attributes by applying the dynamic testing parameters to the test instances. These parameters are specified in the part objects.

Thereafter, block 432 depicts using the test instances to generate test cases. Only those test cases that are needed in order to properly test the parts that have been selected are generated. Thus, the generated test cases are tailored to this customized product. The process then terminates as depicted by block 436.

Figure 5A:
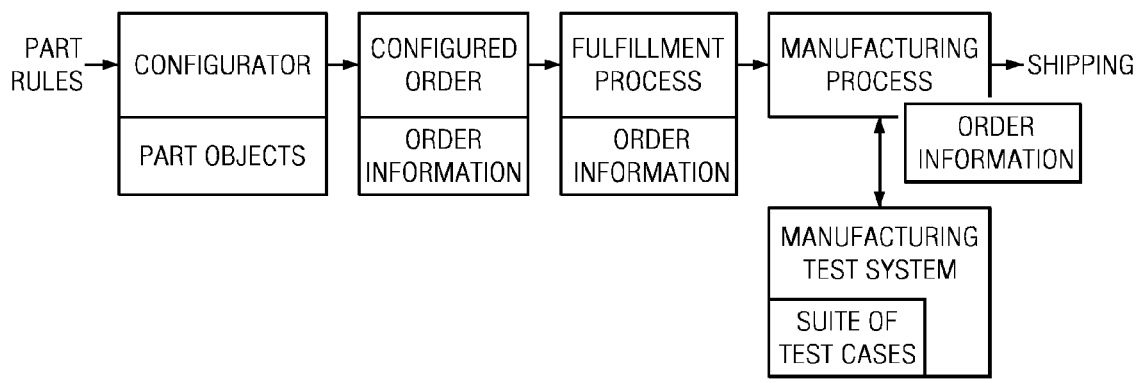
FIG. 5A is a high level block diagram of the process of receiving an order for a customized product, using part objects to generate order information, and using that order information in the fulfillment and manufacturing process, and then testing the customized product using the full suite of tests in accordance with the prior art.

FIG. 5A is a high level block diagram of the process of receiving an order for a customized product, using part objects to generate order information, and using that order information in the fulfillment and manufacturing process, and then testing the customized product using the full suite of tests in accordance with the prior art.

The prior art process uses an order configuration application, referred to as a "configurator", to create an order. The configurator includes part rules and part objects. Once a user has finished customizing a product using the configurator, the configurator generates order information in the form of a configured order. The configured order is then submitted to the fulfillment and manufacturing processes for fulfillment and manufacturing. In the manufacturing process, the order is received and the customized product is built. The manufacturing test system then applies the full suite of test cases to test the order. All test cases in the suite are applied to the customized product regardless of which parts are actually included in the customized product. After all test cases have run clean and any errors corrected, the product is moved to the packaging area to be shipped.

Figure 5B:
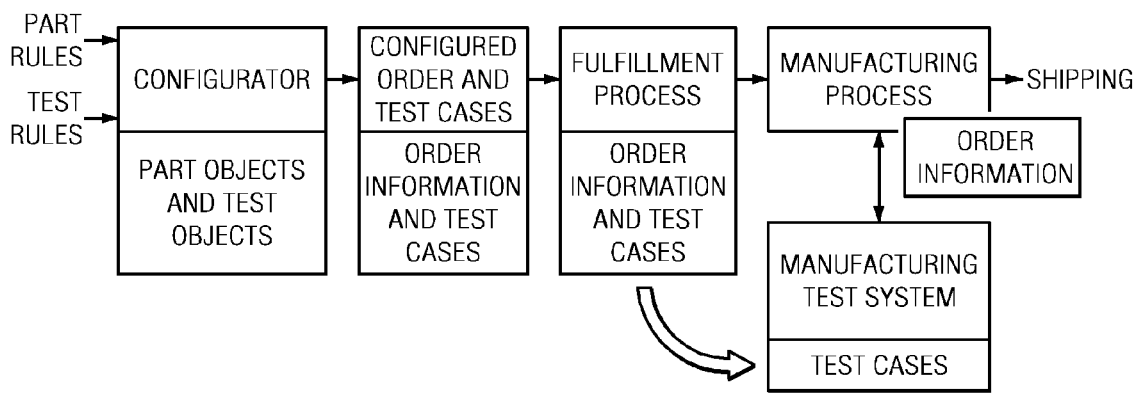
FIG. 5B is a high level block diagram of the process of receiving an order for a customized product, using part objects and test objects that are included in the same configuration to generate order information and customized test cases, using the order information in the fulfillment and manufacturing process, and using the customized test cases to test the customized product in accordance with the illustrative embodiment.

FIG. 5B is a high level block diagram of the process of receiving an order for a customized product, using part objects and test objects that are included in the same configurator to generate order information and test cases, using the order information in the fulfillment and manufacturing process, and using the test cases to test the customized product using this customized set of test cases in accordance with the illustrative embodiment.

The illustrative embodiment uses an order configuration application, referred to as a "configurator", to create an order. The configurator includes part rules, part objects, test rules, and test objects. Once a user has finished customizing a product using the configurator, the configurator generates order information in the form of a configured order, and generates test cases. These test cases are only those tests cases that are necessary to test the product as it has been customized. Thus, these test cases are the test cases that are specified for testing the parts that are actually included in the customized product order.

The configured order and test cases are then submitted to the fulfillment for fulfillment. The order is submitted to the manufacturing process and the customized product is built.

The test cases are supplied to the manufacturing test system. The manufacturing test system will now apply the test cases, which have been tailored to this specific order. After the tailored tests have run clean and any errors corrected, the product is moved to the packaging area to be shipped.

Figure 6:
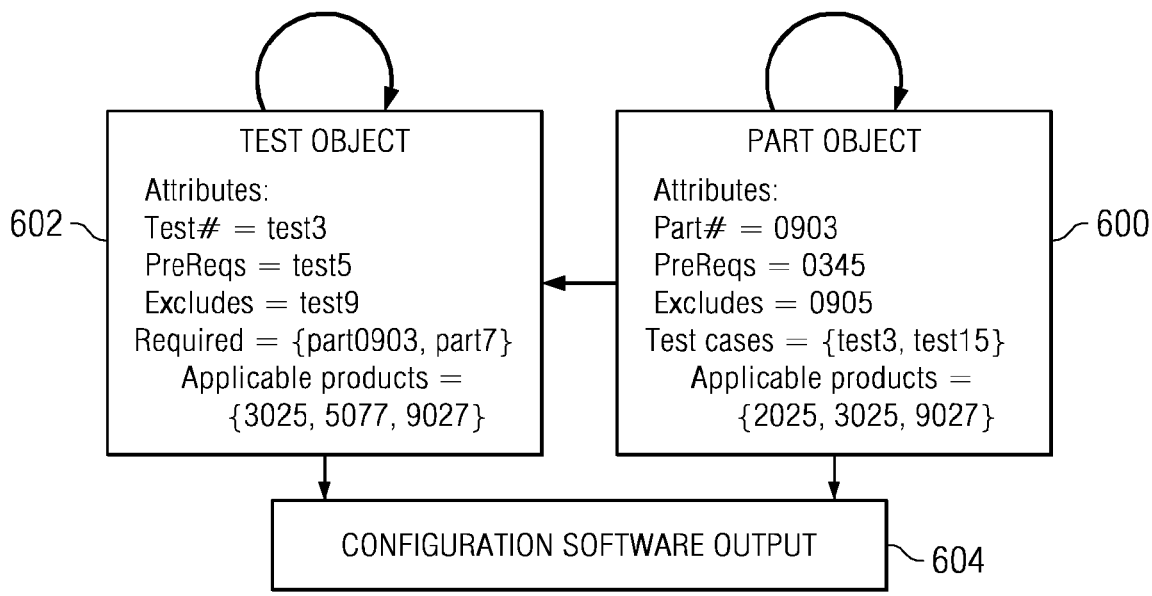
FIG. 6 is a block diagram of objects that are included in a single configuration software application and the output that the application produces in accordance with the illustrative embodiment.
Figure 7:
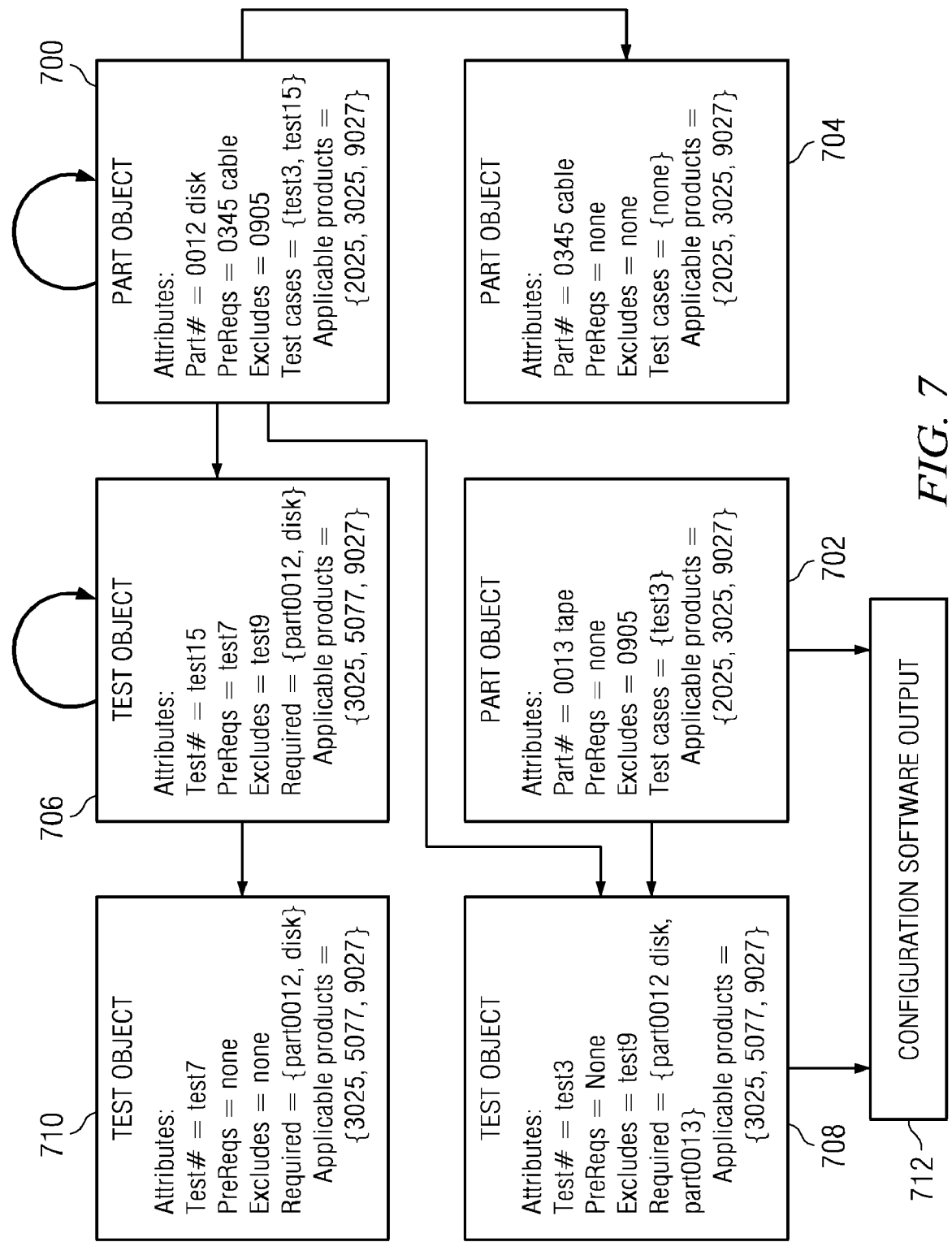
FIG. 7 is a block diagram of objects that are included in a single order configuration software application and the output that the application produces in accordance with the illustrative embodiment.
Figure 8:
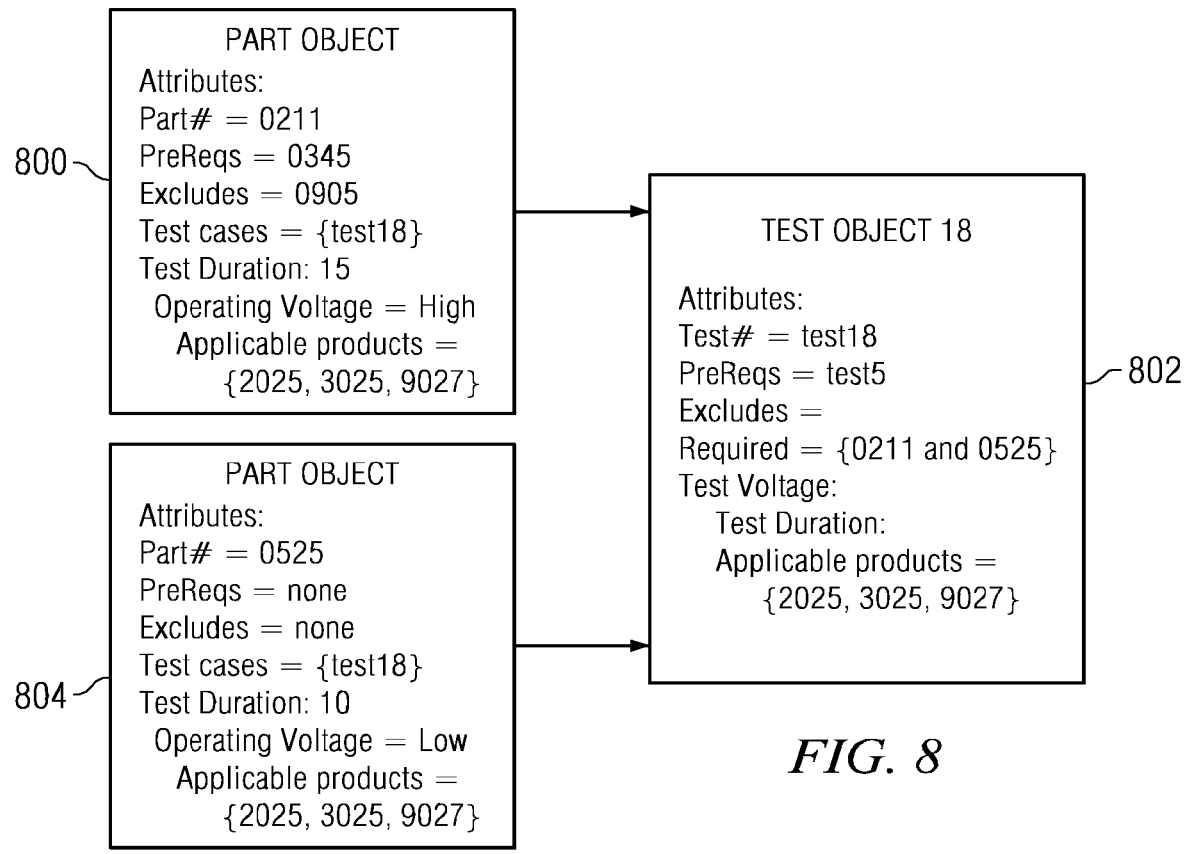
FIG. 8 is a block diagram of objects that are included in a single configuration software application and the internal object representation in accordance with the illustrative embodiment.

FIGS. 6-8 provide examples of part objects, test objects, and the resulting configuration software output.

FIG. 6 is a block diagram of objects that are included in a single configuration software application and the output that the application produces in accordance with the illustrative embodiment. A part object 600 and test object 602 have been defined within the same configuration software application.

Part object 600 includes a "Part #", "PreReqs", "Excludes", "Test cases", and "Applicable products" attributes. The "Part #" attribute indicates part object 600 was defined for part 0903. Therefore, part object 600 is associated with part 0903.

The "PreReqs" attribute indicates that part 0903 requires part 0345. Therefore, when part 0903 is selected, part 0345 must also be selected because part 0345 is needed to support part 0903. The part object that is associated with part 0345 is not shown.

The "Excludes" attribute indicates that part 0903 excludes part 0905. Therefore, when part 0903 is selected, part 0905 cannot be selected.

The "Test cases" attribute indicates that test cases 3 and 15 are required in order to test part 0903. The "Test cases" attribute associates part object 600 with the test objects that are associated with test cases 3 and 15. Therefore, part object 600 is associated with test object 602.

The "Applicable products" attribute indicates that part 0903 can be included in products 2025, 3025, and 9027.

The same order configuration software application that includes part object 600 also includes test object 602.

Test object 602 includes "Test #", "PreReqs", "Excludes", "Required", and "Applicable products" attributes.

The "Test #" attribute indicates that test object 602 was defined for test case 3. Therefore, test object 602 is associated with test case 3.

The "PreReqs" attribute is used to associate a test object with other test objects. The "PreReqs" attribute in test object 602 indicates that when test case 3 is performed, test case 5 must also be performed. The test object that is associated with test case 5 is not shown.

The "Excludes" attribute is used to disassociate a test object from other test objects. The "Excludes" attribute in test object 602 indicates that test case 3 excludes test case 9. Therefore, when test case 3 is performed, test case 9 should not be performed, and the results of test 9 case are not valid.

The "Required" attribute indicates that test case 3 is required in order to test part 0903 and part 7.

The "Applicable products" attribute indicates that test case is performed for a part that can be included in products 3025, 5077, and 9027.

When the configuration software, which includes part object 600 and test object 602, is run, and part 0903 is selected, an instance of part object 600 will be created. Since part object 600 is associated with test object 602, when the instance of part object 600 is created, an instance of test object 602 will also be created.

Further, since the "PreReqs" attribute in part object 600 lists part 0345, an instance of part 0345's part object will also be created. And, in a similar manner, since the "PreReqs" attribute in test object 602 lists test case 5, an instance of test case 5's test object will also be created.

The configuration software will generate order information using the part instance that was created using part object 600. The configuration software will also generate a test case using the test instance created using test object 602. The order information and test case will be output together as configuration software output 604.

FIG. 7 is a block diagram of objects that are included in a single order configuration software application and that output that the application produces in accordance with the illustrative embodiment.

Part object 700 includes a "Part #", "PreReqs", "Excludes", "Test cases", and "Applicable products" attributes. The "Part #" attribute indicates part object 700 was defined for part 0012.

The "PreReqs" attribute indicates that part 0012 requires part 0345. Therefore, when part 0012 is selected, part 0345 must also be selected.

The "PreReqs" attribute in a part object associates two or more part objects. Thus, part object 700 is associated with part object 704 because part 0345 is listed in the "PreReqs" attribute in part object 700 and part object 704 was defined for part 0345.

The "Excludes" attribute indicates that part 0012 excludes part 0905. Therefore, when part 0012 is selected, part 0905 cannot be selected. In a manner that is similar to the "PreReqs" attribute, the "Excludes" attribute is used to disassociate part objects. Thus, part object 700 is disassociated with the part object that is associated with part 0905.

The "Test cases" attribute indicates that test case 3 and test case 15 are required in order to test part 0012.

The "Applicable products" attribute indicates that part 0012 can be included in products 2025, 3025, and 9027.

Part object 702 includes a "Part #", "PreReqs", "Excludes", "Test cases", and "Applicable products" attributes. The "Part #" attribute indicates part object 702 was defined for part 0013.

The "PreReqs" attribute indicates that part 0013 does not require another part.

The "Excludes" attribute indicates that part 0013 excludes part 0905. Therefore, when part 0013 is selected, part 0905 cannot be selected.

The "Test cases" attribute indicates that test case 3 is required in order to test part 0013.

The "Applicable products" attribute indicates that part 0013 can be included in products 2025, 3025, and 9027.

Part object 704 includes a "Part #", "PreReqs", "Excludes", "Test cases", and "Applicable products" attributes. The "Part #" attribute indicates part object 704 was defined for part 0345.

The "PreReqs" attribute indicates that part 0345 does not require another part.

The "Excludes" attribute indicates that part 0345 does not exclude another part.

The "Test cases" attribute indicates that no test cases are required in order to test part 0345.

The "Applicable products" attribute indicates that part 0345 can be included in products 2025, 3025, and 9027.

The same configuration software application that includes part objects 700, 702, and 704 also includes test objects 706, 708, and 710.

Test object 706 includes "Test #", "PreReqs", "Excludes", "Required", and "Applicable products" attributes. The "Test #" attribute indicates that test object 706 was defined for test case 15.

The "PreReqs" attribute indicates that when test case 15 is performed, test case 7 must also be performed. The "PreReqs" attribute is used to associate a test object with one or more other test objects. Therefore, test object 706 is associated with test object 710 because the "PreReqs" attribute in test object 706 identifies test object 710 since test object 710 was created for test case 7.

The "Excludes" attribute indicates that test case 15 excludes test case 9. Therefore, when test case 15 is performed, test case 9 should not be performed, and the results of test case 9 are not valid.

The "Required" attribute indicates that test case 15 is required in order to test part 0012.

The "Applicable products" attribute indicates that test case 15 is performed for a part that can be included in products 3025, 5077, and 9027.

Test object 708 includes "Test #", "PreReqs", "Excludes", "Required", and "Applicable products" attributes. The "Test #" attribute indicates that test object 708 was defined for test case 3.

The "PreReqs" attribute indicates that when test case 3 is performed, no other test case needs to be performed.

The "Excludes" attribute indicates that test case 3 excludes test case 9. Therefore, when test case 3 is performed, test case 9 should not be performed, and the results of test case 9 are not valid.

The "Required" attribute indicates that test case 3 is required in order to test parts 0012 and 0013.

The "Applicable products" attribute indicates that test case 3 is performed for a part that can be included in products 3025, 5077, and 9027.

Test object 710 includes "Test #", "PreReqs", "Excludes", "Required", and "Applicable products" attributes. The "Test #" attribute indicates that test object 710 was defined for test case 7.

The "PreReqs" attribute indicates that when test case 7 is performed, no other test needs to be performed.

The "Excludes" attribute indicates that test case 7 does not exclude other test cases. Therefore, when test case 7 is performed, the results of all other test cases are valid.

The "Required" attribute indicates that test case 7 is required in order to test part 0012.

The "Applicable products" attribute indicates that test case 7 is performed for a part that can be included in products 3025, 5077, and 9027.

When the configurator that includes part objects 700, 702, and 704 and test objects 706, 708, and 710, and part 0012 is selected, an instance of part object 700 will be created. Because part object 700 is associated with part object 704, an instance of part object 704 is also created when the instance of part object 700 is created.

Since part object 700 is associated with test objects 706 and 708, when the instance of part object 700 is created, an instance of test objects 706 and 708 will also be created. In addition, since test object 706 is associated with test object 710, an instance of test object 710 is also created when the instance of test object 706 is created.

When the configurator includes part objects 700, 702, and 704 and test objects 706, 708, and 710, and part 0013 is selected, an instance of part object 702 will be created. Because part object 702 is associated with part object 704, an instance of part object 704 is created when the instance of part object 702 is created.

Since part object 702 is associated with test object 708, when the instance of part object 702 is created, an instance of test object 708 will also be created.

The order configuration software will generate order information using the part instances created of part objects 700, 702, and 704. The order configuration software will also generate test cases using the test instances created of test objects 706, 708, and 710. The order information and test cases will be output together as configuration software output 712.

FIG. 8 is a block diagram of objects that are included in a single configuration software application and the output that the application produces in accordance with the illustrative embodiment. Part objects 800 and 804, and test object 802 are included in the same configuration software application.

Part object 800 includes a "Part #", "PreReqs", "Excludes", "Test cases", "Test Duration", "Operating Voltage", and "Applicable products" attributes. The "Part #" attribute indicates that part object 800 was defined for part 0211.

The "PreReqs" attribute indicates that part 0211 requires part 0345. Therefore, when part 0211 is selected, part 0345 must also be selected. The part object that is associated with part 0345 is not shown.

The "Excludes" attribute indicates that part 0211 excludes part 0905. Therefore, when part 0211 is selected, part 0905 cannot be selected.

The "Test cases" attribute indicates that test 18 is required in order to test part 0211. The "Test cases" attribute associates part object 800 with the test object that is associated with test case 18.

The "Test Duration" attribute is a dynamic testing attribute. The "Test Duration" attribute is used to indicate that the length of time test case 18 should be performed is "15".

The "Operating Voltage" attribute is another dynamic testing attribute. It is used to indicate that the voltage for test case 18 is "High".

The "Applicable products" attribute indicates that part 0211 can be included in products 2025, 3025, and 9027.

Test object 802 includes "Test #", "PreReqs", "Excludes", "Required", "Test Voltage", "Test Duration", and "Applicable products" attributes. The "Test #" attribute indicates that test object 802 was defined for test case 18.

The "PreReqs" attribute is used to associate a test object with other test objects. The "PreReqs" attribute in test object 802 indicates that when test case 18 is performed, test case 5 must also be performed. The test object that is associated with test case 5 is not shown.

The "Excludes" attribute is used to disassociate a test object from other test objects. The "Excludes" attribute in test object 802 indicates that no test case is excluded. Therefore, when test case 18 is performed, there is no other test case that should not be performed, and the results of all tests cases are valid.

The "Required" attribute indicates that test case 18 is required in order to test parts 0211 and 0525.

The "Test Voltage" and "Test Duration" attributes are dynamic testing attributes. The values for these two attributes are determined when the test instance is created for test object 802. For the example depicted in FIG. 8, when part 0211 is selected, a test instance of test object 802 is created. This test instance will have a test voltage of "high" and a test duration of "15".

Part object 804 includes a "Part #", "PreReqs", "Excludes", "Test cases", "Test Duration", "Operating Voltage", and "Applicable products" attributes. The "Part #" attribute indicates that part object 804 was defined for part 0525.

The "PreReqs" attribute indicates that part 0525 does not require another part. The "Excludes" attribute indicates that part 0525 does not exclude any parts.

The "Test cases" attribute indicates that test case 18 is required in order to test part 0525. The "Test cases" attribute associates part object 804 with the test object 802.

The "Test Duration" attribute is a dynamic testing attribute. It is used to indicate the length of time test case 18 should be performed is "10".

The "Operating Voltage" attribute is a dynamic testing attribute. It is used to indicate the voltage for test case 18 is "Low".

The "Applicable products" attribute indicates that part 0525 can be included in products 2025, 3025, and 9027.

When the part instance for part object 800 is created, a test instance of test object 802 is created having a test voltage of "high" and a test duration of "15". When the part instance for part object 804 is created, another test instance of test object 802 is also created. This second test instance has a test voltage of "low" and a test duration of "10".

The data processing systems described below are examples of systems that can be used to implement the illustrative embodiment.

Figure 9:
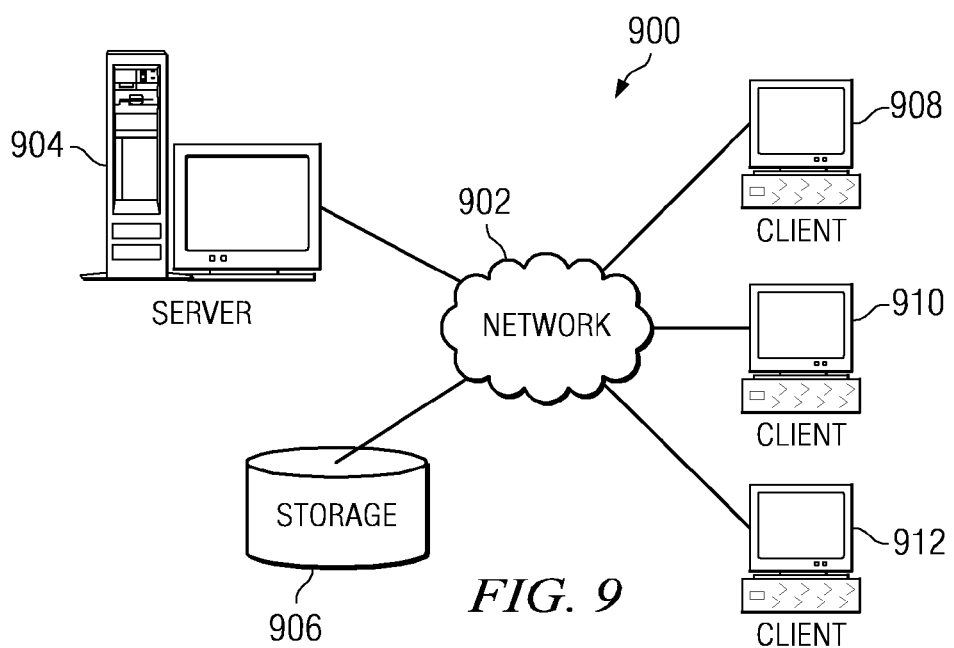
FIG. 9 is a pictorial representation of a network of computer systems that includes the illustrative embodiment.

FIG. 9 is a pictorial representation of a network of computer systems that includes the illustrative embodiment. Network data processing system 900 is a network of computers in which the preferred embodiment may be implemented. Network data processing system 900 contains a network 902, which is the medium used to provide communications links between various devices and computers connected together within network data processing system 900. Network 902 may include connections, such as wire, wireless communication links, or fiber optic cables.

In the depicted example, a server 904 is connected to network 902 along with storage unit 906. In addition, clients 908, 910, and 912 also are connected to network 902. These clients 908, 910, and 912 may be, for example, personal computers, network computers, or other computing devices. In the depicted example, server 904 provides data, such as boot files, operating system images, and applications, to clients 908-912. Clients 908, 910, and 912 are clients to server 904. Network data processing system 900 may include additional servers, clients, and other devices not shown.

In the depicted example, network data processing system 900 is the Internet with network 902 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 900 also may be implemented as a number of different types of networks, such as for example, an intranet, a local area network (LAN), a wide area network (WAN), or a wireless network. FIG. 9 is intended as an example, and not as an architectural limitation for the preferred embodiment.

Figure 10:
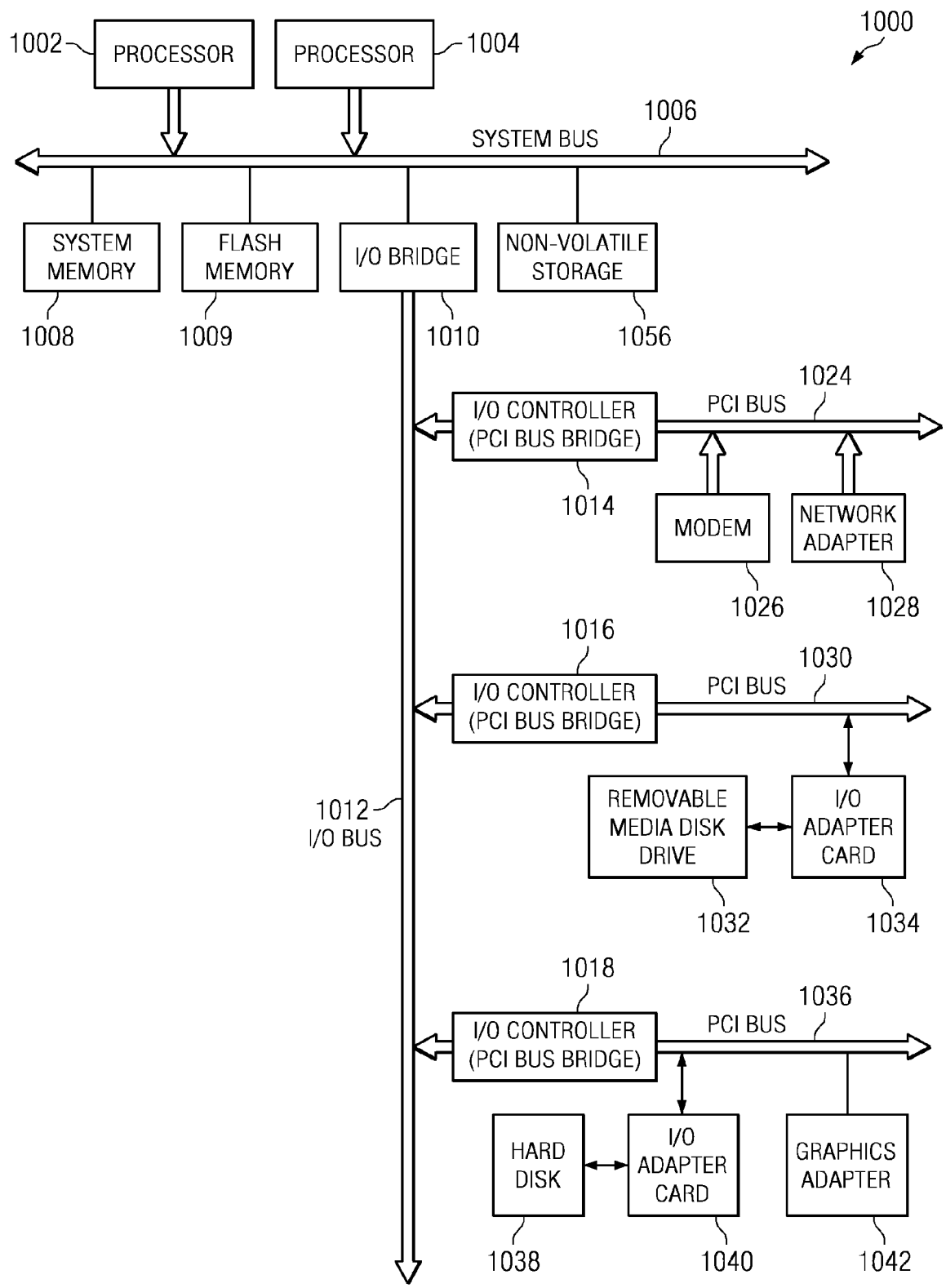
FIG. 10 is a block diagram of a computer system that includes the illustrative embodiment.

FIG. 10 is a block diagram of a computer system that includes the illustrative embodiment. Computer system 1000 may be a symmetric multiprocessor (SMP) system including a plurality of processors 1002 and 1004 connected to system bus 1006. Alternatively, a single processor system may be employed. Also connected to system bus 1006 are system memory 1008, flash memory 1009, and non-volatile storage (NV-RAM) 1056. I/O bus bridge 1010 is connected to system bus 1006 and provides an interface to I/O bus 1012.

System 1000 includes one or more I/O controllers. According to the depicted embodiment, each I/O controller is implemented as a PCI Bus Bridge. Those skilled in the art will recognize that other technologies may be used to implement an I/O controller.

Peripheral component interconnect (PCI) bus bridge 1014 connected to I/O bus 1012 provides an interface to PCI local bus 1024. A number of modems may be connected to PCI bus 1024. Typical PCI bus implementations will support four PCI expansion slots or add-in connectors. Communications links to other computers may be provided through modem 1026 and network adapter 1028 connected to PCI local bus 1024 through add-in boards. In this manner, data processing system 1000 allows connections to multiple external network computers.

PCI bus bridge 1016 is connected to PCI local bus 1030. A storage device, such as a media disk drive 1032, is included in system 1000. A storage device, such as a disk drive 1032 capable of receiving removable media, is included in system 1000. Removable media includes DVD-ROMs, CD-ROMs, floppy disk, tapes, and other media. Media disk drive 1032 is coupled to PCI bus 1030 via an I/O adapter card 1034.

PCI bus bridge 1018 is connected to PCI local bus 1036. Another storage device, such as a hard disk drive 1038, is included in system 1000. Hard disk drive 1038 is coupled to PCI bus 1036 via an I/O adapter card 1040. A memory-mapped graphics adapter 1042 may also be connected to I/O bus 1036 as depicted.

Those of ordinary skill in the art will appreciate that the hardware depicted in FIGS. 9 and 10 may vary. For example, other peripheral devices, such as optical disk drives and the like, also may be used in addition to or in place of the hardware depicted. The depicted example is not meant to imply architectural limitations with respect to the preferred embodiment.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for optimizing manufacturing testing of a customized configuration of a product, said method comprising:

defining, within an order configuration application, a plurality of part objects, each one of said plurality of part objects associated with one of a plurality of parts;

defining, within said order configuration application, a plurality of test objects, each one of said plurality of test objects associated with one of a plurality of test cases;

generating, using said order configuration application, order information using ones of said plurality of part objects that are associated with ones of said plurality of parts that are selected to be included in a customized product; and generating test cases, using said order configuration application, using at least one of said plurality of test objects that is associated with said ones of said plurality of part objects.

2. The method according to claim 1, wherein said test cases are needed to test parts that are included in said customized product.

3. The method according to claim 1, wherein said test cases are only those of a plurality of test cases that are needed to test said customized product.

4. The method according to claim 1, further comprising:

said plurality of parts being all possible parts that could be selected to be included in said customized product.

5. The method according to claim 1, further comprising:

each one of said plurality of test objects associated with one of a plurality of test cases.

6. The method according to claim 5, further comprising:

said plurality of tests including all test cases that are necessary to test all of said plurality of parts.

7. The method according to claim 1, further comprising:

defining said plurality of part objects and said plurality of test objects within an object oriented software environment; and said order configuration application executing within said object oriented software environment.

8. The method according to claim 1, further comprising:

defining an attribute, in each one of said plurality of part objects, that lists at least one of said plurality of test objects, wherein said attribute is used to associate each one of said plurality of part objects with said at least one of said plurality of test objects; and wherein said attribute is used to associate each one of said plurality of part objects with said at least one of said plurality of test objects.

9. The method according to claim 1, further comprising:

defining an attribute, in ones of said plurality of test objects, that lists at least one other of said plurality of test objects; and wherein said attribute is used to associate said ones of said plurality of test objects with said at least one other one of said plurality of test objects.

10. The method according to claim 1, further comprising:

selecting a particular one of said plurality of parts;

using a particular one of said plurality of part objects that is associated with said particular one of said plurality of parts to identify a particular one of said plurality of test objects; and said particular one of said plurality of test objects defined for a particular test case, said particular test case necessary to be performed for said particular one of said plurality of parts.

11. A computer program product, which is stored in a computer-readable medium in a data processing system, comprising:

said computer-readable medium having computer usable program code for optimizing manufacturing testing of a customized configuration of a product, said computer program product including:

said computer usable program code for defining, within an order configuration application, a plurality of part objects, each one of said plurality of part objects associated with one of a plurality of parts;

said computer usable program code for defining, within said order configuration application, a plurality of test objects, each one of said plurality of test objects associated with one of a plurality of test cases;

said computer usable program code for generating, using said order configuration application, order information using ones of said plurality of part objects that are associated with ones of said plurality of parts that are selected to be included in a customized product; and said computer usable program code for generating test cases, using said order configuration application, using at least one of said plurality of test objects that is associated with said ones of said plurality of part objects.

12. The computer program product according to claim 11, wherein said test cases are only those of a plurality of test cases that are needed to test said customized product.

13. The computer program product according to claim 11, further comprising:

said plurality of parts being all possible parts that could be selected to be included in said customized product.

14. The computer program product according to claim 11, further comprising:

each one of said plurality of test objects associated with one of a plurality of test cases.

15. The computer program product according to claim 14, further comprising:

said plurality of tests including all test cases that are necessary to test all of said plurality of parts.

16. The computer program product according to claim 11, further comprising:

said computer usable program code for defining said plurality of part objects and said plurality of test objects within an object oriented software environment; and said order configuration application executing within said object oriented software environment.

17. The computer program product according to claim 11, further comprising:

said computer usable program code for defining an attribute, in each one of said plurality of part objects, that lists at least one of said plurality of test objects, wherein said attribute is used to associate each one of said plurality of part objects with said at least one of said plurality of test objects; and wherein said attribute is used to associate each one of said plurality of part objects with said at least one of said plurality of test objects.

18. The computer program product according to claim 11, further comprising:

said computer usable program code for defining an attribute, in ones of said plurality of test objects, that lists at least one other of said plurality of test objects; and wherein said attribute is used to associate said ones of said plurality of test objects with said at least one other one of said plurality of test objects.

19. The computer program product according to claim 11, further comprising:

said computer usable program code for selecting a particular one of said plurality of parts;

using a particular one of said plurality of part objects that is associated with said particular one of said plurality of parts to identify a particular one of said plurality of test objects; and said particular one of said plurality of test objects defined for a particular test case, said particular test case necessary to be performed for said particular one of said plurality of parts.

20. An apparatus in a data processing system, which includes a central processing unit (CPU)m for optimizing manufacturing testing of a customized configuration of a product, said apparatus comprising:

said data processing system including an order configuration application that includes a plurality of part objects, each one of said plurality of part objects associated with one of a plurality of parts;

said CPU executing code for transforming said order configuration application by defining, within said order configuration application, a plurality of test objects, each one of said plurality of test objects associated with one of a plurality of test cases;

said CPU executing code for generating, using said order configuration application, order information using ones of said plurality of part objects that are associated with ones of said plurality of parts that are selected to be included in a customized product; and said CPU executing code for generating test cases, using said order configuration application, using at least one of said plurality of test objects that is associated with said ones of said plurality of part objects.

\* \* \* \* \*